United States Patent
Hiramatsu

(12) 
(10) Patent No.: US 6,600,935 B1
(45) Date of Patent: Jul. 29, 2003

(54) RADIO TRANSMISSION DEVICE AND TRANSMISSION DIRECTIVITY ADJUSTING METHOD

(75) Inventor: Katsuhiko Hiramatsu, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/701,342

(22) PCT Filed: Mar. 29, 2000

(86) PCT No.: PCT/JP00/01930
§ 371 (c)(1),
(2), (4) Date: Nov. 28, 2000

(87) PCT Pub. No.: WO00/60698
PCT Pub. Date: Oct. 12, 2000

(30) Foreign Application Priority Data

Mar. 31, 1999 (JP) .......................... 11-093983

(51) Int. Cl.⁷ ............................................ H04B 1/38
(52) U.S. Cl. ..................... 455/562; 455/69; 455/91; 342/378
(58) Field of Search ............... 455/562, 91, 116, 455/522, 69, 67.1, 67.3, 277.1, 101, 103; 342/368, 378

(56) References Cited

U.S. PATENT DOCUMENTS

| | | | | |
|---|---|---|---|---|
| 5,745,858 A | * | 4/1998 | Sato et al. ................. | 455/562 |
| 5,894,598 A | * | 4/1999 | Shoki ......................... | 455/562 |
| 5,999,826 A | * | 12/1999 | Whinnett ................... | 455/69 |
| 6,058,318 A | * | 5/2000 | Kobayakawa et al. ...... | 455/562 |
| 6,091,788 A | * | 7/2000 | Keskitalo et al. .......... | 455/562 |

FOREIGN PATENT DOCUMENTS

| | | |
|---|---|---|
| JP | 1154604 | 6/1989 |
| JP | 1241203 | 9/1989 |
| JP | 0052423 | 1/1993 |
| JP | 10336149 | 12/1998 |

OTHER PUBLICATIONS

PCT International Search Report dated Jun. 26, 2000.
PCT International Search Report dated Jul. 11, 2000.

* cited by examiner

*Primary Examiner*—Edward F. Urban
*Assistant Examiner*—Lana Le

(57) ABSTRACT

A reference signal is modulated in a modulation circuit 101. The modulated reference signal is multiplied by a transmission weight before being performed radio transmission processing at transmission RF circuits 109 to 111. Respective reference signals are combined at a combining circuit 119. Then, the combined reference signals are compared with original reference signal at a correction value control circuit 121. On the basis thereof, respective correction values of a phase and an amplitude are obtained. A radio transmission device adjusts the phase and the amplitude of transmission signal while employing the correction values.

9 Claims, 7 Drawing Sheets

RADIO TRANSMISSION DEVICE AND TRANSMISSION DIRECTIVITY ADJUSTING METHOD

TECHNICAL FIELD

The present invention relates to a radio transmission device which has function for performing directional transmission and to a transmission directivity adjusting method.

BACKGROUND ART

Generally, a propagation path of a digital radio communication system consists of many multi-paths. For that reason, the propagation path in the digital radio communication system has a frequency characteristic for a transmission line. Concretely, the propagation path in the digital radio communication system has a transmission characteristic of selectivity to the frequency. Furthermore, when a communication terminal device moves like a mobile station, these characteristics change in accordance with a lapse of time with motion of the communication terminal device. As a result, the reception signal undergoes effect of different fading within the bandwidth. The fading is called as a selective fading.

It is necessary to take countermeasure to the selective fading. There is the adaptive-array technique for the countermeasure of the selective fading. The adaptive-array technique is a technique that it allows a plurality of antenna elements to be prepared, and the plurality of antenna elements receive the signal, subsequently, it causes the reception signal to be weighted before combining.

Furthermore, there is the transmission directivity control technique. In such the transmission directivity control technique, the signal is transmitted while employing the same radiation pattern as the reception radiation pattern on the basis of the weight factor of the reception signal, which is combined while utilizing the above-described adaptive-array technique. In this transmission directivity control technique, since it allows the signal not to be transmitted in the direction of arrival of the unnecessary signal, the transmission side is capable of securing the multi-path propagation path. For that reason, it comes unnecessary to provide advanced technique that it allows the equalizer and so forth to be equipped at the receiver (terminal side). Furthermore, it allows the signal not to be transmitted in the direction of arrival of the unnecessary signal, therefore, the area which the transmitted radio wave reaches is limited, thus it enables the frequency utilization efficiency of the downlink to be improved.

There is described the radio transmission device having the transmission directivity control function while employing FIG. 1. As shown in FIG. 1, in the radio transmission device, the modulation circuit 1 modulates the transmission signal, before sending the modulation signal to the vector multipliers 3 to 5 for performing the directional transmission. Here, the vector multiplication is the processing that it permits the amplitude and the phase of the transmission signal to be changed for the directional transmission. When the transmission is the directional transmission in which it allows only the phase to be altered, such the directional transmission is called as the phase shift type transmission to be exact. However, in this case, the vector multiplication is universally employed. Consequently, also it causes the phase shift type transmission to be described as the vector multiplication.

The vector multipliers 6 to 8 multiply the respective modulation signals obtained from the vector multipliers 3 to 5 on the basis of the weights from the transmission weight circuit 2 and the correcting weight circuit 21 by the transmission weight for the directional transmission, thus sending the signal after multiplication toward the transmission RF circuits 9 to 11.

The transmission RF circuits 9 to 11 input therein the signal after multiplication. In the transmission RF circuits 9 to 11, it causes the frequency conversion for the transmission carrier frequency and the amplification to be executed with respect to the inputted signal. The frequency conversion is performed in such a way that it permits the frequency to be adjusted while employing the frequency source 12. The transmission signal is transmitted from the antennas 16 to 18 passing through the distributors 13 to 15.

In order to perform the directional transmission accurately, the vector difference among the respective antennas in the output of the vector multipliers 6 to 8 and the vector difference among the respective antennas in the antenna output terminals are required to be the same vector difference. When the vector differences are different, it is incapable of executing the directional transmission in the right direction. However, in some cases, the outputs of the vector multipliers 6 to 8 pass through the respective transmission RF circuits 9 to 11, therefore, the vector difference among the respective antennas in the antenna output terminals differ from the vector difference among the respective antennas in the outputs of the vector multipliers 6 to 8.

Formerly, there is the method for adjusting the directional transmission while correcting such the vector differences. As shown in FIG. 1, it permits the signal to be extracted from the distributors 13 to 15 immediately in front of the antennas 16 to 18, before causing the signal to be converted into the same frequency as that of the output of the vector multipliers 6 to 8 at the reception RF circuit 19 while employing the same frequency source as that of the transmitter. Further, the phase and the amplitude immediately before transmission of the converted signal are measured in the measuring device 20 to compare with the phase and the amplitude to be the output of the vector multipliers 6 to 8. This processing is performed in every respective antennas. According to the operation, it is capable of obtaining errors which appear caused by passing through the transmission RF circuits 9 to 11.

Furthermore, it permits the correction value to be determined for correcting the amplitude and the phase of the respective antennas while taking the phase and the amplitude about one of any antennas to be the reference. Then, the correcting weight circuit 21 stores therein the correction value. The correction values are sent to the vector multipliers 3 to 5. The correction values are employed as it permits the transmission weight sent from the transmission weight circuit 2 to be corrected. Moreover, in order to detect differences of the amplitude and the phase among the respective antennas, respective phases and amplitudes in respective measuring sections of the measuring device 20 are necessary to be adjusted in the same value.

However, in such the adjusting method, on the occasion of the measuring, connection of the connector or so forth becomes necessary, therefore, adjustment becomes complicated, further there is the problem that it is necessary to adjust the phase and the amplitude in every connection of the connectors.

On the other hand, in order to cause the change of connection of the connector to be unnecessary, it is preferable to prepare the reception RF circuit as many as the number corresponding to the number of the antennas (in the example, three antennas), however, generally, it is very difficult to prepare a plurality of the reception RF circuits whose amplitude characteristic and phase characteristic are entirely the same.

DISCLOSURE OF INVENTION

In view of the foregoing, it is an object of the present invention, in order to overcome the above-mentioned problem to provide a radio transmission device and transmission directivity adjusting method in which change for connection of the connectors on the occasion of adjusting of the phase and the amplitude can be dispensed with, and it is capable of correcting characteristic of the amplitude and the phase by only one reception RF section.

The subject matter of the present invention is that it causes the transmission directivity to be adjusted while employing correction values of the antenna. The correction values of the antennas are obtained as follows. The distributor immediately in front of the antenna distributes the signals of the respective antennas. It permits the signals to be combined for generating combined signal. Subsequently, it causes the correction value of the respective antennas to be obtained while employing the combined signal and the reference signal. It allows the correction value of the respective antennas to be obtained such that difference between the phase of the combined signal and the phase of the reference signal become the minimum value and that difference between the amplitude of the combined signal and the amplitude of the reference signal become the minimum value. The correction value of the antenna is updated employing newly obtained correction values. Thus, the transmission directivity is adjusted while employing these correction values.

BEST MODE FOR CARRYING OUT THE INVENTION

Hereinafter, there will be described the embodiments of the present invention in detail in accordance with the accompanying drawings.

Embodiment 1

Figure 1:
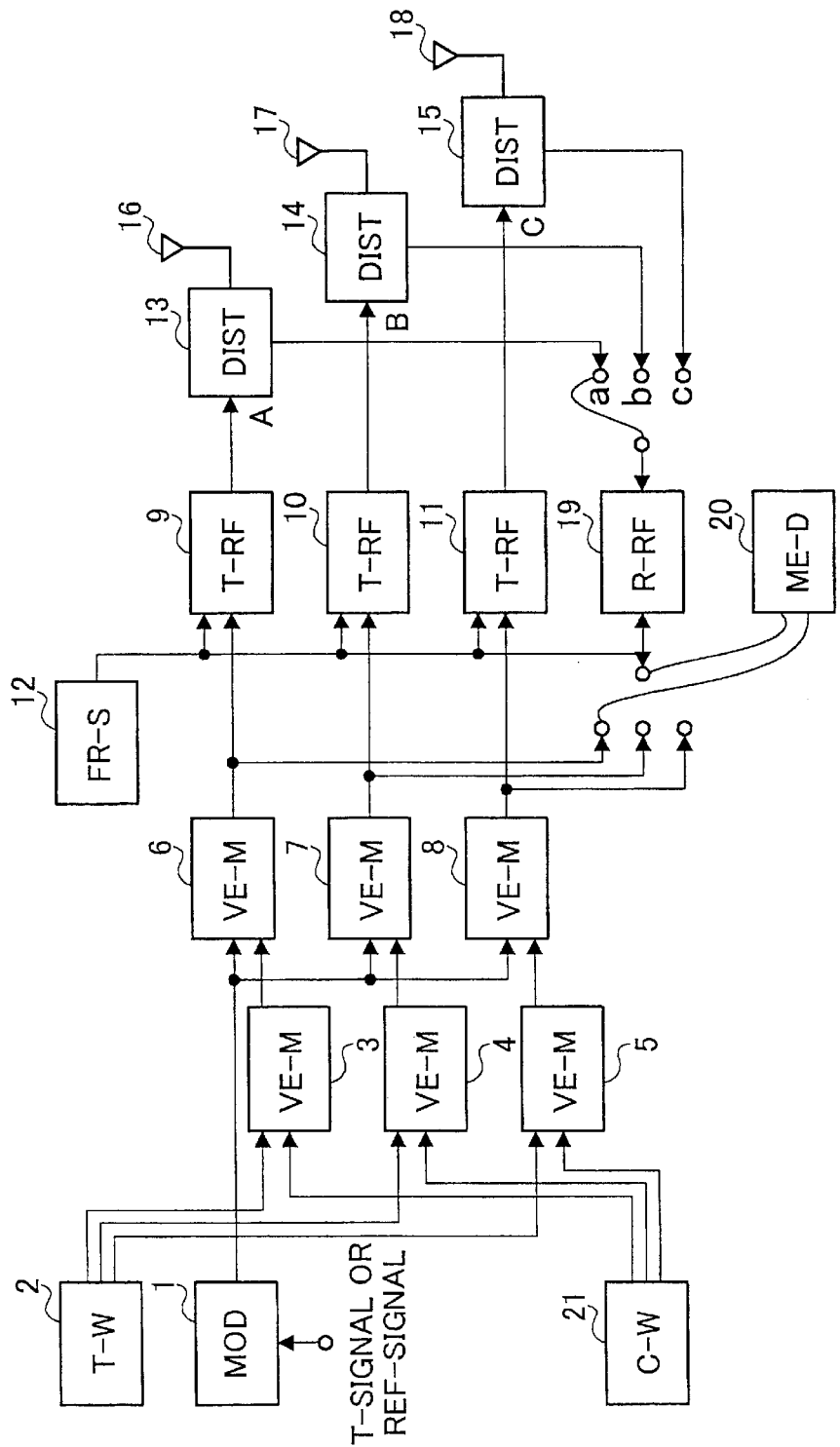
FIG. 1 is a block diagram showing a constitution of the conventional radio transmission device.
Figure 2:
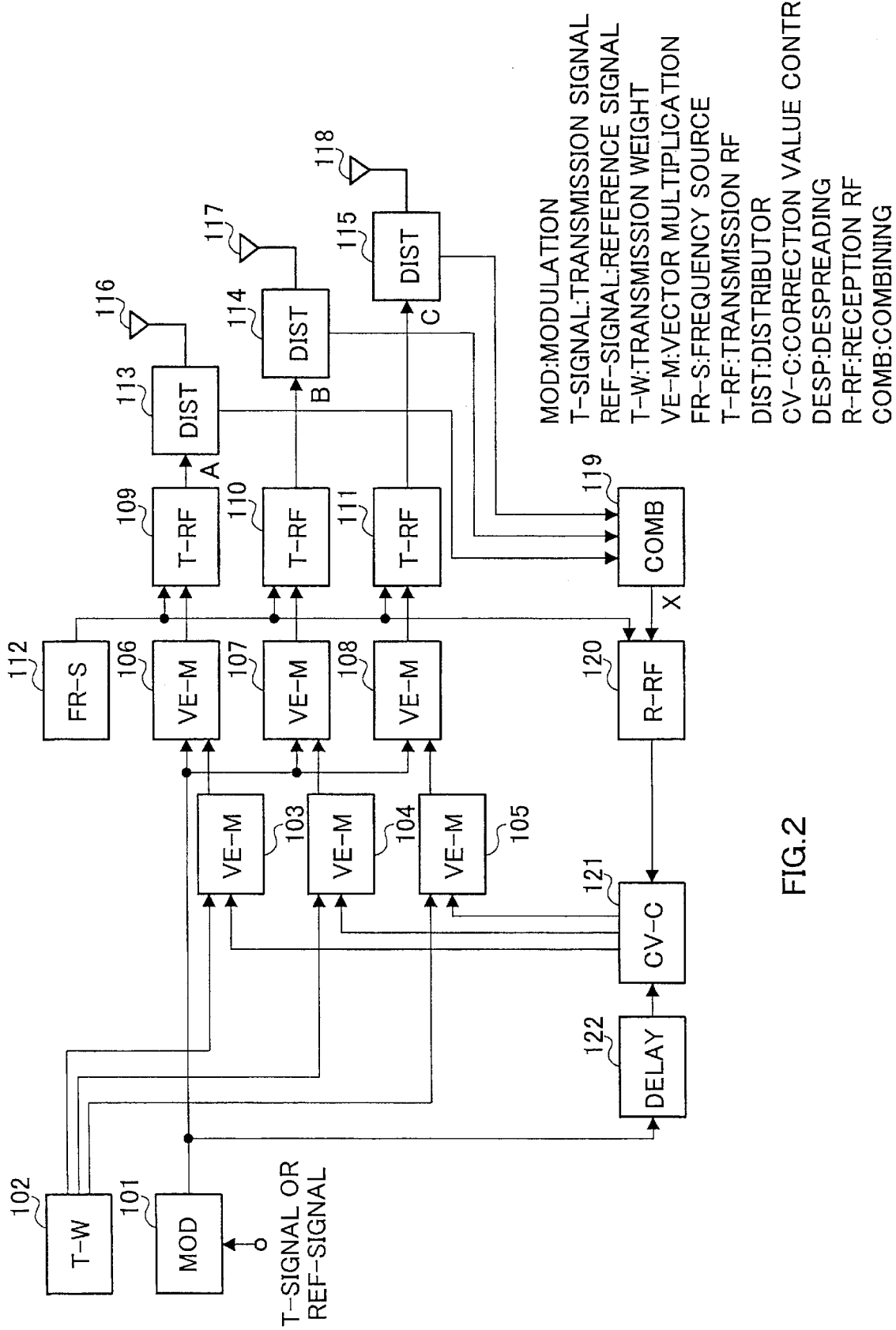
FIG. 2 is a block diagram showing a constitution of a radio transmission device according to an embodiment 1 of the present invention.
Figure 3:
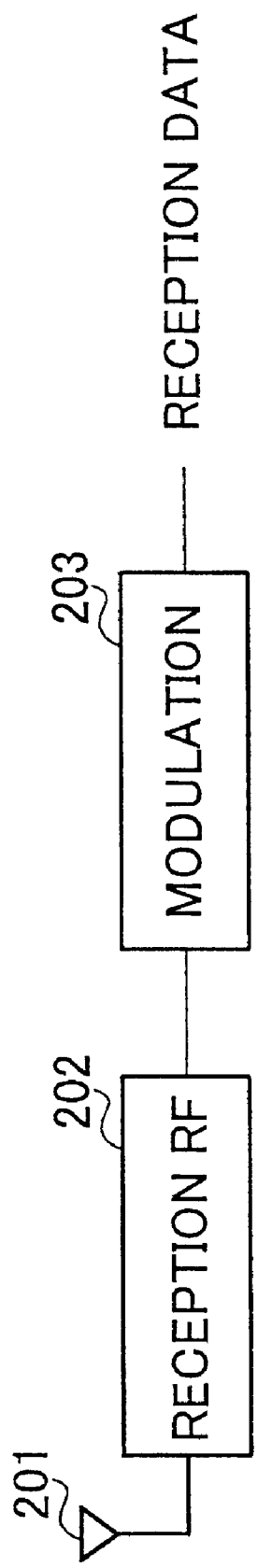
FIG. 3 is a block diagram showing a constitution of a radio reception device performing radio communication with the radio transmission device shown in FIG. 2 therebetween.

FIG. 2 is a block diagram showing a constitution of a radio transmission device according to the embodiment 1 of the present invention. Further, FIG. 3 is a block diagram showing a constitution of a radio reception device performing radio communication with the above-described radio transmission device.

In the radio transmission device, a modulation circuit 101 modulates a transmission signal to send the modulated signal to vector multipliers 106 to 108 which are to perform directional transmission. Here, the vector multiplication is processing that it permits amplitudes and phases of the transmission signal to be changed for the directional transmission. In the case where the transmission is the directional transmission in which it allows only the phase to be changed, such the directional transmission is called as the phase shift type transmission to be exact. However, in this case, the vector multiplication is generally employed widely. consequently, also it causes the phase shift type transmission to be described as the vector multiplication.

In the vector multipliers 106 to 108, the modulation signals obtained from the respective vector multipliers 103 to 105 on the basis of the weight from the transmission weight circuit 102 and correction values from the correction value control circuit 121 is multiplied by the transmission weights for directional transmission. The vector multipliers 106 to 108 send the signal after multiplication to transmission RF circuits 109 to 111.

The transmission RF circuits 109 to 111 perform frequency conversion of the inputted signal into transmission carrier frequency and amplification of the inputted signal. The frequency conversion is performed in such a way that the frequency is adjusted while employing a frequency source 112. The transmission signal is transmitted from antennas 116 to 118 while passing through distributors 113 to 115.

Furthermore, the radio transmission device is provided with a combining circuit 119 for combining outputs from the distributors 113 to 115, a reception RF circuit 120 for performing frequency conversion of the output from the combining circuit 119 while employing frequency of the frequency source 112, a delay circuit 122 for delaying the modulation signal, and a correction value control circuit 121 for obtaining the correction value of the phase and the amplitude while employing the delayed modulation signal and the output from the reception RF circuit 120.

In the meantime, the radio transmission device transmits the signal. An antenna 201 of a radio reception device shown in FIG. 3 receives the transmission signal. The reception RF circuit 202 performs both of the frequency conversion and the amplification of reception signal after signal reception, before the modulation circuit 203 modulates the reception signal, then the signal becomes a reception data while being modulated.

Next, there will be described operation of the radio transmission device having the above-described constitution.

Firstly, in the ordinary communication, the above-described operation is performed. In order to perform the directional transmission accurately, vector difference among respective antennas in the output of the vector multipliers 106 to 108 are required to be the same value as that of vector difference among respective antennas in antenna output terminals. For that reason, It is necessary to be the same value with respect to the both vector differences.

Consequently, correction value calculation operation for permitting the both vector differences to be the same value becomes necessary. Subsequently, there will described the correction value calculation operation.

The modulation circuit 101 inputs therein a reference signal whose transmission content is known. Further, in FIG. 2, the modulation circuit 101 inputs therein either the reference signal or the transmission signal while respective signals being switched suitably according to switching means not illustrated. Furthermore, with respect to the transmission weight, it allows the transmission weight of the whole antennas to be 1 (one). Thus, it causes transmission operation to be performed in the same way as the ordinary communication state.

The radio transmission device extracts the reference signal from the distributors 113 to 115 immediately in front of the antennas 116 to 118 to send to the combining circuit 119. The combining circuit 119 inputs therein the reference signals. These signals are combined in the combining circuit 119. The combined signal is a signal including error caused by the transmission RF circuits 109 to 111. Further, the combining processing is processing that it causes respective signals to be combined before dividing by the number of the antennas.

At this time, it is necessary to obtain an accurate correction value. In order to obtain the accurate correction value, it is necessary to be adjusted the respective vector values into the same values. Namely, a vector (vector AX) from an input point A of the distributor 113 to an output point X of the combining circuit 119, a vector (vector BX) from an input point B of the distributor 114 to an output point X of the combining circuit 119, and a vector (vector CX) from an input point C of a distributor 115 to an output point X of the combining circuit 119 are necessary to be adjusted into the same value.

Next, the combined signal is sent to the reception RF circuit 120. The combined signal is converted into a base band signal while undergoing frequency conversion with the same frequency as the frequency supplied to the transmission RF circuits 109 to 111. Further, the base band signal after frequency conversion undergoes quasi-coherent detection. According to this operation, it is capable of being obtained information of the phase and the amplitude with regard to the combined signal. Furthermore, the signal after quasi-coherent detection is converted into signal with the same frequency as that of the output of the vector multipliers 106 to 108. The combined base band signal is inputted to the correction value control circuit 121.

In the meantime, the reference signal after modulation processing is inputted to the delay circuit 122. The delay circuit 122 delays the reference signal during at least the period when the modulation signal is inputted to the correction value control circuit 121 via the distributors 113 to 115, before being sent to the correction value control circuit 121.

The correction value control circuit 121 compares the phase and the amplitude of the combined base band signal with the phase and the amplitude of the reference signal undergoing delay processing. The correction values of respective antennas are obtained so that difference of the phase and the amplitude about the both signals become the minimum value. The correction value is updated on the basis of the newly obtained correction values. Furthermore, a renewal method of the correction value is performed while employing an adaptive algorithm of error minimization method and so forth. The renewal of the correction value is capable of being executed by the error minimization method of the adaptive algorithm easily.

Thus, the radio transmission device calculates the correction value of the weight about the respective antennas. On the basis of the correction values, the vector multipliers 103 to 105 adjust the transmission weight from the transmission weight circuit 102 according to the vector multiplication. Thus, the error of the phase and the amplitude which come from the fact that the transmission weight passes through the transmission RF circuit 109 to 111 is removed.

Figure 4A:
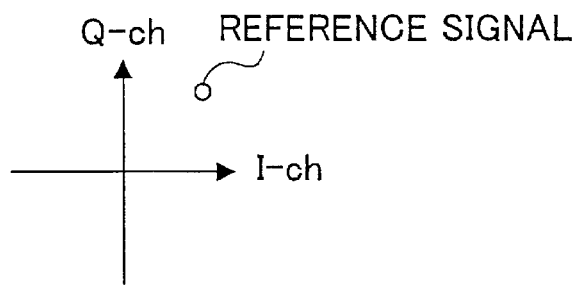
FIG. 4A is a signal point arrangement view for explaining a transmission directivity adjusting method in the above-described embodiment.
Figure 4B:
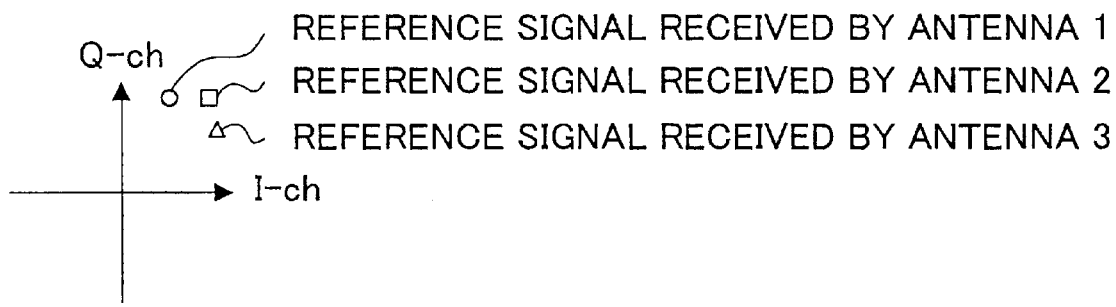
FIG. 4B is a signal point arrangement view for explaining a transmission directivity adjusting method in the above-described embodiment.

There will be described error cancellation about the phase and the amplitude in accordance with FIG. 4. The modulation circuit 101 modulates the reference signal. The reference signal after modulation has the phase and the amplitude as shown in FIG. 4A. The phase and the amplitude are known. The transmission RF circuits 109 to 111 perform radio transmission processing while the reference signal being multiplied by the transmission weight, on this occasion, divergence occurs in the respective phase and amplitude as shown in FIG. 4B. In FIG. 4B, respective reference signals (a mark of ○, a mark of, and a mark of Δ) correspond to the outputs from the distributors 113 to 115.

Figure 4C:
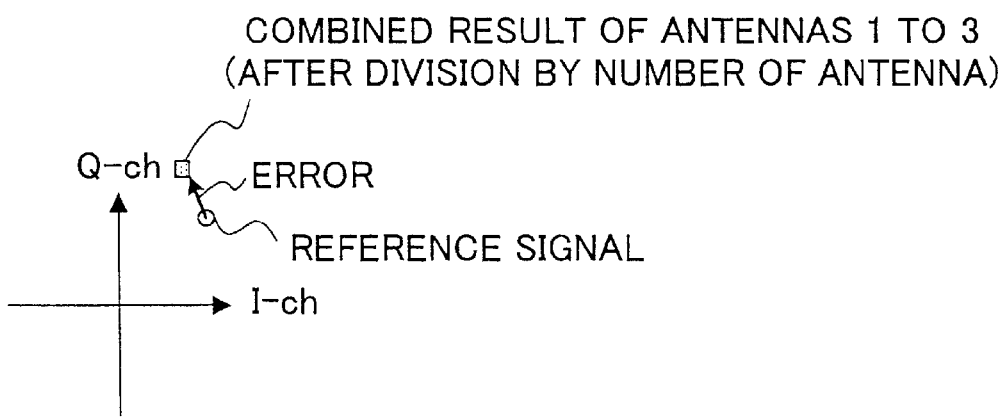
FIG. 4C is a signal point arrangement view for explaining a transmission directivity adjusting method in the above-described embodiment.

The combining circuit 119 combines the reference signals. When it permits the combined signal to be divided by the number of the antennas, the phase and the amplitude shown in FIG. 4C are obtained (a mark of ■ in FIG. 4C). This corresponds to the output of the combining circuit 119. The correction value control circuit 121 calculates the correction value while obtaining error between original reference signal (a mark of ○) and the combined reference signal (a mark of ■). This corresponds to the output of the correction value control circuit 121. The radio transmission device adjusts the phase and the amplitude of the transmission signal while employing the correction value.

Thus, the phase and the amplitude are adjusted, namely, the transmission directivity is adjusted before it causes a signal inputted to the modulation circuit 101 to be switched from the reference signal to transmission signal according to a switching means. Further, also it causes the transmission weight from the transmission weight circuit 102 to be switched to a transmission weight for the transmission signal. Thus, the radio transmission device shifts to the directional transmission after prescribed change is performed. Furthermore, the transmission weight is obtained for instance, on the basis of reception weights.

In the radio transmission device and the transmission directivity adjusting method according to the embodiment, it permits the phase and the amplitude not to be corrected individually with regard to the signal transmitted from the respective antennas. However, it becomes the state where it causes the difference to be obtained between the vector difference among respective antennas in the outputs of the vector multipliers 106 to 108 and the vector difference among respective antennas in the antenna output terminals inevitably. Consequently, according to such the adjustment of the transmission directivity, it is capable of performing the directional transmission accurately. Further, change of connection of the connector is unnecessary on the occasion of adjustment for the phase and the amplitude, and it is capable of correcting characteristic of the amplitude and the phase due to only one reception RF section. Thus, it is capable of planning simplification of the device.

Embodiment 2

In this embodiment 2, there will be described the case where it causes the adjusting method of the transmission directivity of the present invention to be applied to CDMA (Code Division Multiple Access) system.

Figure 5:
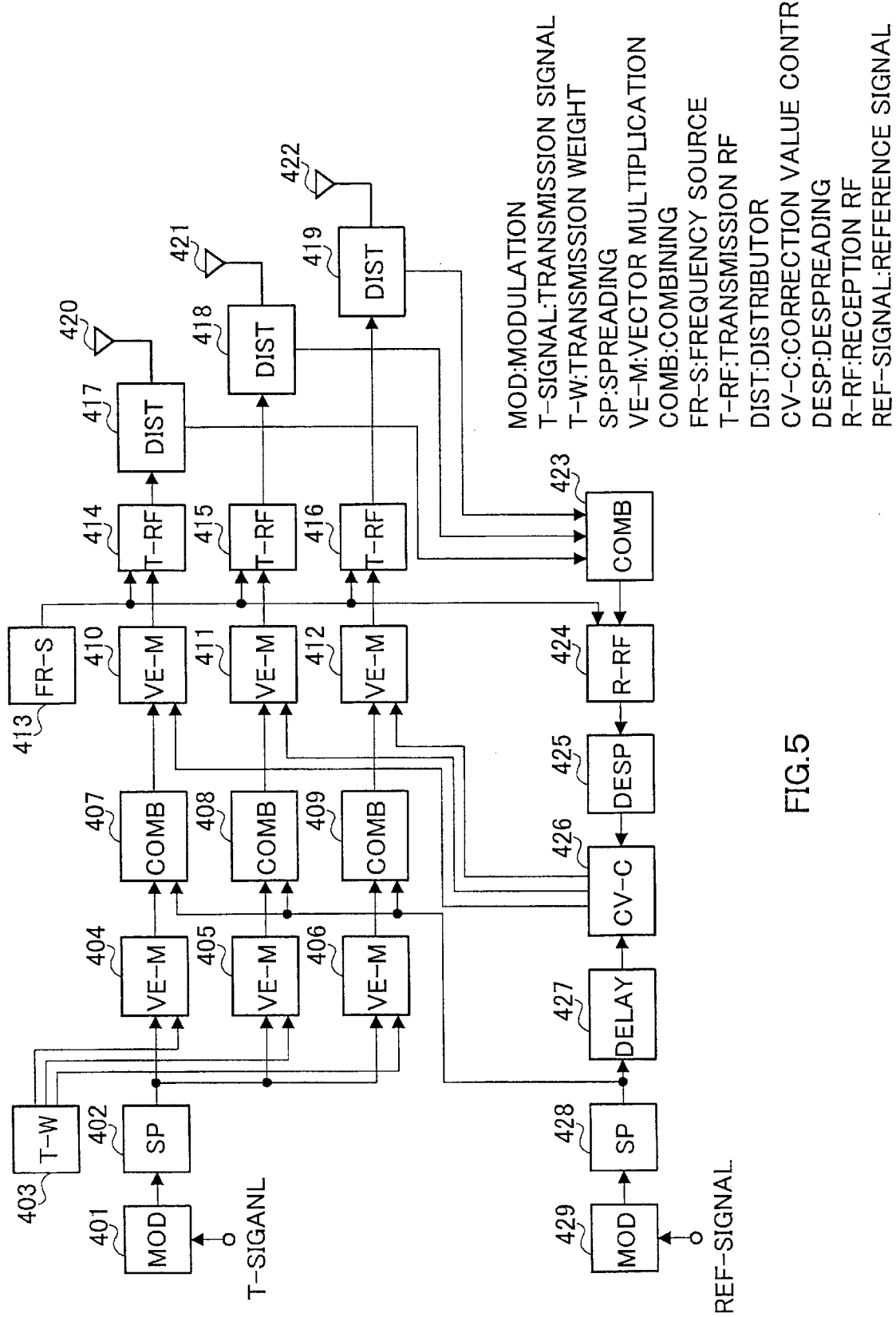
FIG. 5 is a block diagram showing a constitution of a radio transmission device according to an embodiment 2 of the present invention.

FIG. 5 is a block diagram showing a constitution of a radio transmission device according to the embodiment 2 of the present invention.

In the radio transmission device, the modulation circuit 401 modulates the transmission signal to send to a spreading circuit 402. The spreading circuit 402 performs spreading processing to a modulation signal while employing prescribed spreading code to send to vector multipliers 404 to 406 for performing the directional transmission. Here, the vector multiplication is a processing that it permits the amplitude and the phase of the transmission signal to be changed for the directional transmission. When the transmission is the directional transmission in which it allows only the phase to be changed, such the directional transmission is called as the phase shift type transmission to be exact. However, in this case, the vector multiplication is generally employed widely. Consequently, also it causes the phase shift type transmission to be described as the vector multiplication.

In the vector multipliers 404 to 406, a weight from a transmission weight circuit 403 is multiplied by a spread signal, then, the signal after multiplication is sent to respective combining circuits 407 to 409. In the combining circuit 407, a reference signal which is modulated in a modulation circuit 429 and which undergoes spreading processing while employing prescribed spreading code in a spreading circuit 428 is combined by the spread signal.

The combined signal is sent to respective vector multipliers 410 to 412. In the vector multipliers 410 to 412, on the basis of a correction value from a correction value control circuit 426, vector multiplication processing is performed with respect to the combined signal, before sending the signal after multiplication to transmission RF circuits 414 to 416.

In the transmission RF circuits 414 to 416, as to the signal inputted, frequency conversion toward transmission carrier frequency and amplification of the signal are performed. The frequency conversion is performed in such a way that the frequency is adjusted while employing a frequency source 413. Thus a transmission signal is generated. The transmission signal passes through distributors 417 to 419 before being transmitted from antennas 420 to 422.

Furthermore, the radio transmission device of the present embodiment comprises a combining circuit 423 for combining outputs from the distributors 417 to 419, a reception RF circuit 424 for performing frequency conversion about an output from the combining circuit 423 while employing a frequency of the frequency source 413, an despreading circuit 425 for performing despreading processing about an output of the reception RF circuit 424, a delay circuit 427 for delaying the spread signal with regard to the reference signal, and a correction value control circuit 426 for obtaining a correction value of the phase and the amplitude while employing both of the delayed modulation signal and the output from the reception RF circuit 424.

In the meantime, the signal transmitted from the radio transmission device is received from an antenna of the radio reception device. As to the reception signal, the reception RF circuit performs frequency conversion and amplifies it. The signal after frequency conversion and amplification undergoes despreading processing while employing the same spreading code as that is employed at the transmission side, before coming into reception data while being modulated at the modulation circuit.

Next, there will be described operation of the radio transmission device of the present embodiment with above-described constitution. In order to perform the directional transmission accurately, vector difference among respective antennas in the output of the vector multipliers 410 to 412 are required to be the same value as that of vector difference among respective antennas in antenna output terminals. For that reason, It is necessary to be the same value with respect to the both vector differences. Consequently, correction value calculation operation for permitting the both vector differences to be the same value becomes necessary. There will be described the correction value calculation operation.

The transmission signal is sent to the modulation circuit 401 to undergo modulation processing. Subsequently, the transmission signal after modulation processing is sent to the spreading circuit 402 to undergo spreading processing while employing prescribed spreading code. In the meantime, the reference signal whose transmission content is known is sent to the modulation circuit 429 to undergo modulation processing. Subsequently, the reference signal after modulation processing is sent to the spreading circuit 428 to undergo spreading processing while employing prescribed spreading code. Here, as to the spreading code employed on the occasion of the spreading processing, the spreading code for transmission signal should differ from the spreading code for the reference signal.

The spread signal of the transmission signal is sent to the vector multipliers 404 to 406. The spread signal is multiplied by a weight from the transmission weight circuit 403 in the vector multipliers 404 to 406. According to the operation of this multiplication, transmission directivity is generated. Furthermore, initial weight for respective antennas is 1 (one).

The spread signal of the transmission signal by which the weight is multiplied is sent to the respective combining circuits 407 to 409. Further, also the spread signal of the reference signal is sent to the combining circuits 407 to 409. In the combining circuits 407 to 409, the spread signal of the transmission signal and the spread signal of the reference signal are combined.

As to the spread signal of the reference signal, the vector multipliers 410 to 412 perform vector multiplication processing while employing the correction value from the correction value control circuit 426, thus, adjustment of the transmission directivity of the spread signal is performed.

The spread signal of the reference signal after adjustment of the transmission directivity and the spread signal of the transmission signal are sent to the transmission RF circuits 414 to 416 to undergo frequency conversion before being amplified. The frequency conversion is performed while employing frequency of the frequency source 413. The spread signal of the transmission signal is transmitted from the antennas 420 to 422 via the distributors 417 to 419.

The spread signals of the reference signals are extracted from the distributors 417 to 419 immediately in front of the antennas 420 to 422 to send to the combining circuit 423. These signals are combined by the combining circuit 423. The combined signals are signals involving errors caused by the transmission RF circuits 414 to 416. Further, the combining processing is processing that it permits respective signals to be combined before the combined signals are divided by the number of the antennas.

At this time, it is necessary to obtain an accurate correction value. In order to obtain the accurate correction value, it is necessary to be adjusted the respective vector values into the same values. Namely, a vector from an input point of the distributor 417 to an output point of the combining circuit 423, a vector from an input point of the distributor 418 to an output point of the combining circuit 423, and a vector from an input point of a distributor 419 to an output point of the combining circuit 423 are necessary to be adjusted to the same value.

Subsequently, the combined signal is sent to the reception RF circuit 424. The combined signal undergoes frequency conversion to become a base band signal while employing the same frequency as that is given to the transmission RF circuits 414 to 416. Furthermore, the base band signal undergoes quasi-coherent detection. According to the above operation, it is capable of being obtained information of the phase and the amplitude about the combined signal. Moreover, the signal after quasi-coherent detection is converted into a signal with the same frequency as that of the output of the vector multipliers 410 to 412. The combined base band signal is sent to the despreading circuit 425 to undergo despreading processing while employing spreading code employed at the spreading circuit 428. The signal after the despreading processing is inputted to the correction value control circuit 426.

On the other hand, the spread signal of the reference signal, which is inputted to the delay circuit 427, is sent to the correction value control circuit 426 while being delayed during at least the period when the spread signal of the reference signal is inputted to the correction value control circuit 426 via the distributors 417 to 419.

The correction value control circuit 426 compares the phase and the amplitude of the combined despread signal with the phase and the amplitude of the spread signal of the reference signal undergoing delay processing. The correction values of respective antennas are obtained in such a way that it causes phase difference between combined despread signal and the spread signal of the reference signal after delay processing to be the minimum value, and that it causes amplitude difference between combined despread signal and the spread signal of the reference signal after delay processing to be the minimum value. The correction values are updated on the basis of the newly obtained correction values. Furthermore, a renewal method of the correction value is performed while utilizing the adaptive algorithm of error minimization method and so forth. The renewal of the correction value is capable of being executed by the error minimization method of the adaptive algorithm easily.

Thus, the radio transmission device calculates the correction value of the weight about the respective antennas. On the basis of the correction values, the vector multipliers 410 to 412 adjust the transmission weight from the transmission weight circuit 403 according to the vector multiplication. Thus, the error of the phase and the amplitude which occurs caused by the fact that the transmission weight passes through the transmission RF circuit 414 to 416 is removed.

Thus, the phase and the amplitude are adjusted, namely, the transmission signal is transmitted in the condition that the transmission directivity is adjusted. Further, also it causes the transmission weight from the transmission weight circuit 403 to be switched to a transmission weight for the transmission signal. Furthermore, the transmission weight is obtained for instance, on the basis of reception weights.

In the radio transmission device and the transmission directivity adjusting method according to the embodiment, it permits the phase and the amplitude not to be corrected individually with regard to the signal transmitted from the respective antennas. However, it becomes inevitably the state where it causes the difference to be obtained between the vector difference among respective antennas in the outputs of the vector multipliers 410 to 412 and the vector difference among respective antennas in the antenna output terminals. Consequently, according to such the adjustment of the transmission directivity, it is capable of performing the directional transmission accurately. Further, change of connection of the connectors is unnecessary on the occasion of adjustment for the phase and the amplitude, and it is capable of correcting characteristic of the amplitude and the phase due to only one reception RF section. Thus, it is capable of planning simplification of the device.

Further, since it permits the transmission signal and the reference signal to undergo code division, it is capable of processing adjustment of the transmission directivity without changing the transmission signal into the reference signal or vice versa. Consequently, adjustment of the transmission directivity is capable of performing parallel to the transmission in accordance with the transmission directivity. As a result, it is capable of reflecting the adjustment result of the transmission directivity to the directional transmission quickly.

Embodiment 3

In the present embodiment, there will be described the case where it causes the adjusting method of the transmission directivity of the present invention to be applied to CDMA system while suppressing interference for another user.

Figure 6:
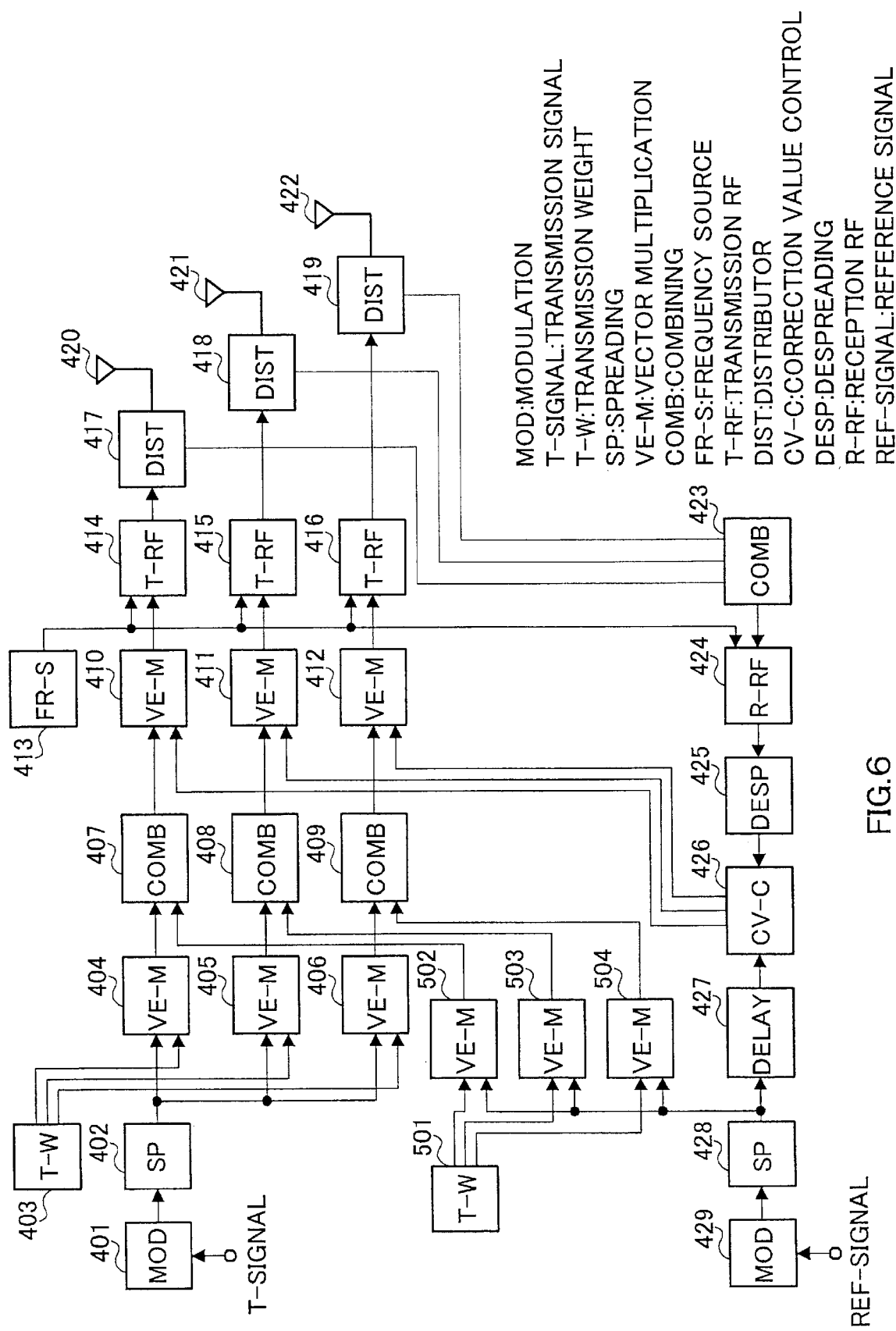
FIG. 6 is a block diagram showing a constitution of a radio transmission device according to an embodiment 3 of the present invention.

FIG. 6 is a block diagram showing a constitution of the radio transmission device according to an embodiment 3 of the present invention. In the present embodiment, the same part as that of the embodiment 2, whose description is omitted because of duplication.

The radio transmission device shown in FIG. 6 comprises a transmission weight circuit 501 for generating different directivity from that of the transmission signal, and vector multipliers 502 to 504.

There will be described operation of the radio transmission device having the above-described constitution.

The transmission signal is sent to the modulation circuit 401. The transmission signal undergoes modulation processing before being sent to the spreading circuit 402. The transmission signal after modulation processing undergoes spreading processing while employing prescribed spreading code. In the meantime, the reference signal whose transmission content is known is sent to the modulation circuit 429. The reference signal undergoes modulation processing before being sent to the spreading circuit 428. The reference signal after modulation processing undergoes spreading processing while employing prescribed spreading code. Here, as to the spreading code employed on the occasion of spreading processing, the spreading code for transmission signal should differ from the spreading code for the reference signal.

The spread signal of the transmission signal is sent to the vector multipliers 404 to 406. The spread signal of the transmission signal is multiplied by a weight from the transmission weight circuit 403 at the vector multipliers 404 to 406. According to this operation, a first transmission directivity is generated.

The spread signal of the reference signal is sent to vector multipliers 502 to 504. The spread signal of the reference signal is multiplied by a weight from the transmission weight circuit 501 at the vector multipliers 502 to 504. According to this operation, a second transmission directivity is generated. Further, initial weight for respective antennas is set to be 1 (one). The second transmission directivity is set in such a way that the transmission directivity with regard to the reference signal comes to the outside area of directivity of the transmission antenna when the transmission antenna has transmission directivity beforehand.

The spread signal of the transmission signal by which the weight is multiplied is sent to respective combining circuits 407 to 409. Further, also the spread signal of the reference signal is sent to respective combining circuits 407 to 409. In the combining circuits 407 to 409, the spread signal of the transmission signal and the spread signal of the reference signal are combined.

As to the spread signal of the reference signal, in the vector multipliers 410 to 412, the spread signal undergoes the vector multiplication processing while employing correction value from the correction value control circuit 426 so that adjustment of the transmission directivity is performed.

The spread signal of the reference signal whose transmission directivity is adjusted and the spread signal of the transmission signal are sent to the transmission RF circuits 414 to 416 before undergoing frequency conversion to be amplified. The frequency conversion is performed while employing frequency of the frequency source 413. The spread signal of the transmission signal is transmitted from the antennas 420 to 422 via the distributors 417 to 419.

In this radio transmission device, adjusting method of the transmission directivity is performed in the same way as the embodiment 2. Consequently, in the radio transmission device and the transmission directivity adjusting method of the present embodiment, it permits the phase and the amplitude not to be corrected individually with regard to the signal transmitted from the respective antennas. However, it becomes inevitably the state where it causes the difference to be obtained between the vector difference among respective antennas in the outputs of the vector multipliers 410 to 412 and the vector difference among respective antennas in the antenna output terminals. Consequently, according to such the adjustment of the transmission directivity, it is capable of performing the directional transmission accurately. Further, change of connection of the connectors is unnecessary on the occasion of adjustment for the phase and the amplitude, and it is capable of correcting characteristic of the amplitude and the phase due to only one reception RF section. Thus, it is capable of planning simplification of the device.

Further, since it permits the transmission signal and the reference signal to undergo code division, it is capable of processing adjustment of the transmission directivity without changing the transmission signal into the reference signal or vice versa. Consequently, adjustment of the transmission directivity is capable of performing parallel to the transmission in accordance with the transmission directivity. As a result, it is capable of reflecting the adjustment result of the transmission directivity to the directional transmission quickly.

Furthermore, in the radio transmission device in the present embodiment, the transmission directivity with regard to the reference signal comes to the outside of directivity of the transmission antenna when the transmission antenna has the transmission directivity beforehand. Therefore, the following effect can be obtained.

The transmission directivity is given by the product between the directivity obtained by digital processing and the directivity of the antenna. It is considered with respect to reception. As shown in FIG. 7A, when the directivity of the antenna is an angle of 120 degrees, the signal which comes from the outside of the angle of 120 degrees, for instance, the other side thereof, is suppressed because the directivity of the antenna does not face the outside of the angle of 120 degrees. The case of transmission is capable of being considered in the same way as that of reception.

Figure 7B:
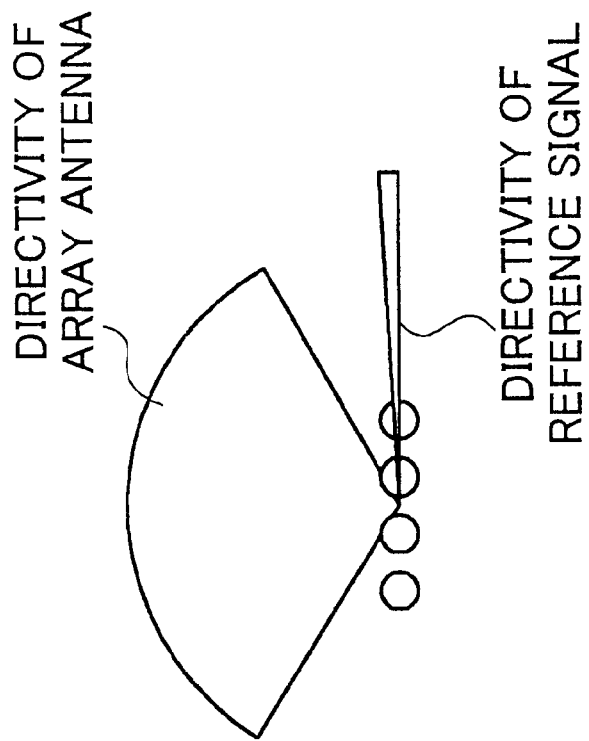
FIG. 7B is a view for explaining a transmission directivity adjusting in the above-described embodiment.
Figure 7A:
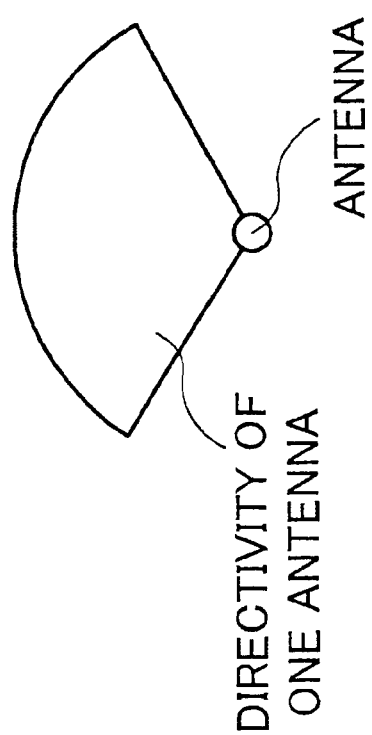
FIG. 7A is a view for explaining transmission directivity adjusting in the above-described embodiment.

Consequently, as shown in FIG. 7B, it causes the transmission directivity with regard to the reference signal for the transmission calibration to be set so as to face it to the outside of the directivity of the antenna, thereby, it is capable of inserting the calibration signal without interference about the ordinary user.

The above-described radio transmission device and the transmission directivity adjusting method according to the embodiments 1 to 3 are capable of being applied to the base station device in the digital radio communication system. For that reason, it is capable of generating accurate transmission directivity with simple constitution, so that it is capable of performing radio communication suitably.

The present invention is possible to be executed while accompanying various alteration and modification regardless of the limitation of the above-described embodiments 1 to 3. For instance, in the above-described embodiments 1 to 3, there is described the case where it permits only the transmitter to be mounted on the radio transmission device and it permits only the receiver to be mounted on the radio reception device. However, since both of the radio transmission device and the radio reception device are capable of performing transmission-reception of the signal, the radio transmission device is provided with the receiver and the radio reception device is provided with the transmitter. Further, in the above-described embodiments 1 to 3, there is described the case where the transmission directivity is variable. However, in the device and the method of the present invention, when the transmission directivity is fixed, weight calculation function becomes useless.

As described above, in the radio transmission device and the transmission directivity adjusting method of the present invention, the distributor immediately in front of the antenna distributes the signals of the respective antennas before permitting the signals to be combined to form combined signal. Subsequently, it causes the correction value of the respective antennas to be obtained while employing the combined signal and the reference signal. It permits the correction value of the respective antennas to be obtained in such a way that difference between the phase of the combined signal and the phase of the reference signal become the minimum value and that difference between the amplitude of the combined signal and the amplitude of the reference signal become the minimum value. The correction values of the respective antennas are updated on the basis of newly obtained values. The transmission device causes the transmission directivity to be adjusted while using the newly obtained correction values. Consequently, change of connection of the connectors is unnecessary on the occasion of adjustment for the phase and the amplitude, and it is capable of correcting characteristic of the amplitude and the phase due to only one reception RF section. Furthermore, according to the above-described matter, it is capable of performing accurate directional transmission.

The present description is grounded on the Japanese Patent Application No. HEI11-093983 filed on Mar. 31, 1999. The Whole content thereof is included in this description.

Industrial Applicability

The present invention is capable of applying to the base station device and the communication terminal device in the digital radio communication system. For that reason, it is capable of generating accurate transmission directivity with simple constitution so that it is capable of performing the radio communication suitably.

What is claimed is:

1. A radio transmission device comprising:
a directivity generator for generating transmission directivity in accordance with a transmission weight while setting the transmission weight about a plurality of antennas;
a first combining means for obtaining a combined signal while combining known signal of radio frequency in accordance with said transmission directivity;
a frequency converter for performing frequency conversion of said combined signal of said radio frequency into a base band signal;
a correction value calculator for obtaining a correction value of said transmission weight from said base band signal and said known signal; and
a transmitter for performing transmission with the transmission directivity generated in accordance with the transmission weight on the basis of the correction value.

2. A radio transmission device as claimed in claim 1, wherein said correction value calculator calculates a correction value which permits a difference between said base band signal and said known signal to be minimized.

3. A radio transmission device comprising:
a first directivity generator for generating a first transmission directivity in accordance with a transmission weight while setting the transmission weight about a plurality of antennas;
a second combining means for combining a transmission signal transmitted from respective antennas in accordance with said first transmission directivity while undergoing spreading-modulation according to a first spreading code and a known signal undergoing spreading-modulation according to a second spreading code;
a first combining means for obtaining a combined signal while combining known signal in accordance with said transmission directivity, which known signal undergoes frequency conversion into radio frequency under prescribed frequency;
a frequency converter for performing frequency conversion of said combined signal of said radio frequency into a base band signal;
a despreading processor for obtaining an despread signal while performing despreading processing of said base band signal;
a correction value calculator for obtaining a correction value of said transmission weight from said known signal undergoing spreading modulation and said despread signal; and
a transmitter for performing transmission with the transmission directivity generated in accordance with the transmission weight on the basis of the correction value.

4. A radio transmission device as claimed in claim 3, wherein said correction value calculator calculates a correction value which permits a difference between said base band signal and said known signal to be minimized.

5. A radio transmission device as claimed in claim 3, wherein there is provided a second directivity generator for generating a second transmission directivity different from said first transmission directivity with regard to said known signal.

6. A base station device provided with a radio transmission device which sets transmission weights about a plurality of antennas, comprising:
a directivity generator for generating transmission directivity in accordance with the transmission weight;
a first combining means for obtaining a combined signal while combining known signal of radio frequency in accordance with said transmission directivity;
a frequency converter for performing frequency conversion of the combined signal of the radio frequency into a base band signal;
a correction value calculator for obtaining a correction value of said transmission weight from said base band signal and said known signal; and
a transmitter for performing transmission with the transmission directivity generated in accordance with the transmission weight on the basis of the correction value.

7. A communication terminal device for performing radio communication to a base station device provided with a radio transmission device which sets transmission weights about a plurality of antennas comprising:
a directivity generator for generating transmission directivity in accordance with said transmission weight;
a first combining means for obtaining combined signal while combining known signal of radio frequency in accordance with said transmission directivity;
a frequency converter for performing frequency conversion of the combined signal of said radio frequency into a base band signal;
a correction value calculator for obtaining a correction value of said transmission weight from said base band signal and said known signal; and
a transmitter for performing transmission with transmission directivity generated in accordance with the transmission weight on the basis of the correction value.

8. A transmission directivity adjusting method comprising the processes of:
a directivity generating process for generating transmission directivity in accordance with a transmission weight while setting the transmission weight about a plurality of antennas;
a first combining process for obtaining a combined signal while combining known signal of radio frequency in accordance with said transmission directivity;
a frequency converting process for performing frequency conversion of the combined signal of said radio frequency into a base band signal; and
a correction value calculating process for obtaining a correction value of said transmission weight from said base band signal and the known signal.

9. A transmission directivity adjusting method comprising the processes of:
a first directivity generating process for generating a first transmission directivity in accordance with a transmission weight while setting the transmission weight about a plurality of antennas;
a second combining process for combining a transmission signal transmitted from respective antennas in accordance with said first transmission directivity while undergoing spreading modulation due to a first spreading code and a known signal undergoing spreading modulation due to a second spreading code;
a first combining process for obtaining a combined signal while combining known signal in accordance with said transmission directivity, which known signal undergoes frequency conversion into radio frequency under prescribed frequency;

a frequency converting process for performing frequency conversion of the combined signal of said radio frequency into a base band signal;

a despreading processing process for obtaining a despread signal while performing despreading processing of said base band signal; and a correction value calculating process for obtaining a correction value of said transmission weight from said known signal undergoing spreading modulation and said despread signal.

* * * * *